US012807818B2

(12) United States Patent
Matsumura

(10) Patent No.: US 12,807,818 B2
(45) Date of Patent: Nov. 24, 2026

(54) METHOD FOR MANUFACTURING SURFACE-TREATED SOL-GEL SILICA PARTICLE, SURFACE-TREATED SOL-GEL SILICA PARTICLE, AND TONER EXTERNAL ADDITIVE FOR ELECTROSTATIC CHARGE IMAGE DEVELOPMENT

(71) Applicant: SHIN-ETSU CHEMICAL CO., LTD., Tokyo (JP)

(72) Inventor: Kazuyuki Matsumura, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 567 days.

(21) Appl. No.: 18/277,804

(22) PCT Filed: Dec. 22, 2021

(86) PCT No.: PCT/JP2021/047477

§ 371 (c)(1),
(2) Date: Aug. 18, 2023

(87) PCT Pub. No.: WO2022/181018

PCT Pub. Date: Sep. 1, 2022

(65) Prior Publication Data

US 2024/0309214 A1 Sep. 19, 2024

(30) Foreign Application Priority Data

Feb. 24, 2021 (JP) ................................ 2021-027678

(51) Int. Cl.
*C09C 1/30* (2006.01)
*G03G 9/097* (2006.01)

(52) U.S. Cl.
CPC ....... *C09C 1/3081* (2013.01); *G03G 9/09725* (2013.01); *C01P 2004/32* (2013.01); *C01P 2004/64* (2013.01); *C01P 2006/10* (2013.01); *C01P 2006/90* (2013.01)

(58) Field of Classification Search
CPC .............. G03G 9/09725; C09C 1/3081; C01P 2004/32; C01P 2004/64; C01P 2006/10; C01P 2006/90
See application file for complete search history.

(56) References Cited

U.S. PATENT DOCUMENTS 5,707,770 A * 1/1998 Tanikawa ........... G03G 9/09716 430/108.6
7,972,682 B2 7/2011 Barthel et al.
8,173,737 B2 5/2012 Scholz et al.
2008/0268362 A1* 10/2008 Kudo ................... G03G 9/0906 430/108.1
2010/0137485 A1* 6/2010 Scholz ..................... C09J 11/04 556/450
2012/0094230 A1 4/2012 Sakoh
2013/0059244 A1* 3/2013 Iwanaga .............. G03G 9/0827 430/108.7

FOREIGN PATENT DOCUMENTS

| | | | | |
|---|---|---|---|---|
| CN | 101679820 | A | | 3/2010 |
| CN | 102369485 | A | | 3/2012 |
| JP | H06-027718 | A | | 2/1994 |
| JP | H11-143118 | A | | 5/1999 |
| JP | 2007-099582 | A | | 4/2007 |
| JP | 2008-174430 | A | | 7/2008 |
| JP | 2008-273757 | A | | 11/2008 |
| JP | 2011-032114 | A | | 2/2011 |
| JP | 2011137097 | A | * | 7/2011 |
| JP | 2014-114175 | A | | 6/2014 |
| JP | 2015-059054 | A | | 3/2015 |

(Continued)

OTHER PUBLICATIONS

JP-2019182687-A Translation (Year: 2026).*
JP-2011137097-A Translation (Year: 2026).*
JP-2016057457-A Translation (Year: 2026).*
Apr. 3, 2025 Office Action issued in Chinese Patent Application No. 202180094301.3.
Mar. 8, 2022 International Search Report issued in International Patent Application No. PCT/JP2021/047477.
Aug. 29, 2023 International Preliminary Report on Patentability issued in International Patent Application No. PCT/JP2021/047477.
Oct. 31, 2025 Office Action issued in Chinese Patent Application No. 202180094301.3.
Mar. 11, 2025 Extended Search Report issued in European Patent Application No. 21928111.0.

(Continued)

*Primary Examiner* — Amber R Orlando
*Assistant Examiner* — Charles Collins Sullivan, IV
(74) *Attorney, Agent, or Firm* — Oliff PLC

(57) ABSTRACT

A method for manufacturing a surface-treated sol-gel silica particle that can impart good flowability when added into a toner and has little change in charge during environment change; a manufacturing method therefor; and an external additive for a toner containing the surface-treated sol-gel silica particle. The method includes steps of: (A1) obtaining a hydrophilic sol-gel silica particle having a silanol group on a surface and substantially composed of a $SiO_2$ unit; (A2) adding a compound having a $(C_2H_5)_3Si$— group or a $R^1R^2{}_2Si$— group, and introducing a $(C_2H_5)_3SiO_{1/2}$ unit or a $R^1R^2{}_2SiO_{1/2}$ unit on a surface of the hydrophilic sol-gel silica particle to obtain a preliminarily treated silica particle; and (A3) adding a compound having a $R^3{}_3Si$— group, and further introducing a $R^3{}_3SiO_{1/2}$ unit on a surface of the preliminarily treated silica particle to obtain a surface-treated sol-gel silica particle.

6 Claims, No Drawings

(56) References Cited

FOREIGN PATENT DOCUMENTS

| | | | | |
|---|---|---|---|---|
| JP | 2016057457 | A | * | 4/2016 |
| JP | 2019182687 | A | * | 10/2019 |
| JP | 2020-033224 | A | | 3/2020 |

OTHER PUBLICATIONS

Feb. 27, 2024 Notification of Reasons for Refusal issued in Japanese Patent Application No. 2021-027678.
Jan. 20, 2026 Office Action issued in Chinese Patent Application No. 202180094301.3.
Feb. 12, 2026 Office Action issued in Korean Patent Application No. 2023-7027820.

* cited by examiner

METHOD FOR MANUFACTURING SURFACE-TREATED SOL-GEL SILICA PARTICLE, SURFACE-TREATED SOL-GEL SILICA PARTICLE, AND TONER EXTERNAL ADDITIVE FOR ELECTROSTATIC CHARGE IMAGE DEVELOPMENT

TECHNICAL FIELD

The present invention relates to a surface-treated sol-gel silica particle, a manufacturing method therefor, and a toner external additive for electrostatic charge image development used for developing an electrostatic charge image in an electrophotographing method, an electrostatic recording method, etc.

BACKGROUND ART

Dry developers used in an electrophotographing method, etc. can be classified into: a single-component developer using a toner itself in which a colorant is dispersed in a binder resin; and a two-component developer in which a carrier is mixed with the toner. When copying is performed by using these developers, the developer is needed to have excellent flowability, caking resistance, fixability, charging property, cleanability, etc. in order to have process compatibility. In particular, to improve the flowability, the caking resistance, the fixability, and the cleanability, an inorganic fine particle is often used as a toner external additive.

However, dispersibility of the inorganic fine particle significantly affects the toner characteristics. Ununiform dispersibility may fail to yield desired characteristics of flowability, caking resistance, and fixability, or may cause insufficient cleanability to generate toner adhesion, etc. on a photoreceptor, which may be a cause of generation of a black-spot-like image defect. For a purpose of improvement of these points, various inorganic fine particles having a hydrophobizing-treated surface are proposed.

In recent years, a copying machine has been required to have high speed and low energy consumption, and a toner has been required to have higher deterioration durability than conventional toners. A toner not having high deterioration durability cannot keep high transferring efficiency of the toner from immediately after the beginning of use until the finish. Proposed as one measure therefor is a technique for inhibiting deterioration of a toner utilizing a spacer effect of a toner external additive with a large particle diameter (Patent Documents 1 and 2).

In addition, a toner external additive with a small particle diameter and a toner external additive with a large particle diameter are often used in combination as the toner external additive. The presence of the toner external additive with a large particle diameter adhering to a toner particle surface reduces frequency that the toner external additive with a small particle diameter adhering to a toner particle surface near the above directly receives external forces such as shearing force and impact force, and can prevent embedding of the toner external additive with a small particle diameter into the toner particle surface due to the external forces (spacer effect), which can inhibit deterioration of the toner.

Externally adding the toner external additive with a large particle diameter enables the toner to easily separate from a photoreceptor. Such a toner on the photoreceptor is rapidly transferred to paper and the transferring efficiency can be kept high. Thus, it is considered that the toner external additive with a large particle diameter also functions as a transferring auxiliary.

A silica with a small particle diameter used in this case is used as a flowability-imparting agent in many cases, and a fumed silica particle manufactured by a combustion method has been mainly used conventionally. However, the conventional fumed silica particle actually improves the flowability, but the addition amount tends to increase in order to improve flowability of recent toners with smaller particle diameter. In addition, the transferring property and cleanability are required more strictly as the image quality increasing, and particles that contain no aggregate and that has excellent dispersibility have been required.

Meanwhile, the aforementioned fumed silica particle is used for a purpose of improvement of charging characteristics, etc. However, hydrophobizing on the surface is typically insufficient and a silanol group remains on the surface, and thereby the silica particle has a problem of difficulty in controlling the charge particularly when the environment changes.

Silica particles with a small particle diameter having not only good flowability but also good charge control have been demanded.

CITATION LIST

Patent Literature

Patent Document 1: JP H06-027718 A
Patent Document 2: JP H11-143118 A

SUMMARY OF INVENTION

Technical Problem

The present invention has been made in view of the above circumstances. An object of the present invention is to provide: a surface-treated sol-gel silica particle that can impart good flowability when added into a toner and that has little change in charge when the environment changes; a manufacturing method therefor; and an external additive for a toner comprising the surface-treated sol-gel silica particle.

Solution to Problem

To solve the above problem, the present invention provides a method for manufacturing a surface-treated sol-gel silica particle, the method comprising steps of:

(A1) hydrolyzing and condensing a tetrafunctional silane compound, a partially hydrolytic-condensed product thereof, or a mixture thereof to obtain a hydrophilic sol-gel silica particle having a silanol group on a surface and substantially composed of a $SiO_2$ unit;

(A2) adding a compound having a $(C_2H_5)_3Si$— group or a $R^1R^2_2Si$— group, wherein $R^1$ represents an alkyl group or alkenyl group having 2 to 8 carbon atoms or an aryl group having 6 to 8 carbon atoms, $R^2$ is identical to or different from each other and represents a substituted or unsubstituted alkyl group having 1 to 4 carbon atoms, to the hydrophilic sol-gel silica particle and introducing a $(C_2H_5)_3SiO_{1/2}$ unit or a $R^1R^2_2SiO_{1/2}$ unit, wherein $R^1$ and $R^2$ are same as above, on a surface of the hydrophilic sol-gel silica particle to obtain a preliminarily treated silica particle; and (A3) adding a compound having a $R^3_3Si$— group, wherein $R^3$ represents a substituted or unsubstituted monovalent hydrocarbon group having 1 to 6 carbon atoms, to the preliminarily treated silica particle and further introducing a $R^3_3SiO_{1/2}$ unit, wherein $R^3$ is same as above, on a surface of the preliminarily treated silica particle to obtain a surface-treated sol-gel silica particle, wherein the unit introduced on the surface of the hydrophilic sol-gel silica particle in the step (A2) and the unit introduced on the surface of the preliminarily treated silica particle in the step (A3) are different from each other.

Such a method for manufacturing a surface-treated sol-gel silica particle can manufacture a surface-treated sol-gel silica particle that can impart good flowability when added into a toner and that has little change in charge when the environment changes.

The step (A1) is preferably a step of hydrolyzing and condensing a tetrafunctional silane compound represented by the general formula (i):

$$Si(OR^4)_4 \quad (i)$$

wherein each of $R^4$ is identical to or different from each other and represents a monovalent hydrocarbon group having 1 to 6 carbon atoms, a partially hydrolytic-condensed product thereof, or a mixture thereof in the presence of a basic substance in a mixed liquid of a hydrophilic organic solvent and water to obtain a mixed-solvent-dispersion of a hydrophilic sol-gel silica particle having a silanol group on a surface and substantially composed of a $SiO_2$ unit, the step (A2) is preferably a step of adding a silazane compound represented by the general formula (ii):

$$R^1R^2_2SiNHSiR^1R^2_2 \quad (ii)$$

wherein $R^1$ and $R^2$ are same as above, hexaethyldisilazane, a monofunctional silane compound represented by the general formula (iii-1):

$$R^1R^2_2SiX \quad (iii\text{-}1)$$

wherein $R^1$ and $R^2$ are same as above and X represents an OH group or a hydrolysable group, a monofunctional silane compound represented by the general formula (iii-2):

$$(C_2H_5)_3SiX \quad (iii\text{-}2)$$

wherein X is same as above, or a mixture thereof into the obtained mixed-solvent-dispersion of the hydrophilic sol-gel silica particle at 0.001 to 1 mol relative to 1 mol of the $SiO_2$ unit in the hydrophilic sol-gel silica particle and introducing a $(C_2H_5)_3SiO_{1/2}$ unit or a $R^1R^2_2SiO_{1/2}$ unit, wherein $R^1$ and $R^2$ are same as above, on a surface of the hydrophilic sol-gel silica particle to obtain a mixed-solvent-dispersion of a preliminarily treated silica particle, and the step (A3) is preferably a step of adding a silazane compound represented by the general formula (iv):

$$R^3_3SiNHSiR^3_3 \quad (iv)$$

wherein $R^3$ is same as above, a monofunctional silane compound represented by the general formula (v):

$$R^3_3SiX \quad (v)$$

wherein $R^3$ and X are same as above, or a mixture thereof into the obtained mixed-solvent-dispersion of the preliminarily treated silica particle at 5 to 50 mol relative to 1 mol of the $SiO_2$ unit in the preliminarily treated silica particle and introducing a $R^3_3SiO_{1/2}$ unit, wherein $R^3$ is same as above, on a surface of the preliminarily treated silica particle to obtain a surface-treated sol-gel silica particle.

The inventive method for manufacturing a surface-treated sol-gel silica particle can be a method as above.

The $R^1$ preferably represents an alkyl group having 6 to 8 carbon atoms, a phenyl group, or a vinyl group, the $R^2$ preferably represents a methyl group, an ethyl group, a propyl group, or an isopropyl group, and the $R^3$ preferably represents a methyl group or an ethyl group.

In the present invention, the surface treatment of the hydrophilic sol-gel silica particle is particularly preferably performed by using such compounds.

The present invention also provides a surface-treated sol-gel silica particle, comprising:

a $R^1R^2_2SiO_{1/2}$ unit, wherein $R^1$ represents an alkyl group or aryl group having 6 to 8 carbon atoms or a vinyl group, and $R^2$ is identical to or different from each other and represents an alkyl group having 1 to 4 carbon atoms, on a surface; and a $R^3_3SiO_{1/2}$ unit, wherein $R^3$ is identical to or different from each other and represents a substituted or unsubstituted monovalent hydrocarbon group having 1 to 6 carbon atoms, on a surface, wherein a median diameter by a dynamic light scattering method is 5 nm to 99 nm, an average circularity is 0.8 to 1.0, a refractive index is 1.38 to 1.42, a true density is 1.7 g/cm$^3$ or more and less than 1.9 g/cm$^3$, a ratio represented by a water-vapor adsorption specific surface area/a nitrogen adsorption specific surface area is 0.4 to 1.9, and a hydrophobicity degree with methanol is 67% or more and 75% or less.

The present invention can be a surface-treated sol-gel silica particle having such characteristics.

In this case, the $R^1$ preferably represents an alkyl group having 6 to 8 carbon atoms, a phenyl group, or a vinyl group, the $R^2$ preferably represents a methyl group, an ethyl group, a propyl group, or an isopropyl group, and the $R^3$ preferably represents a methyl group or an ethyl group.

The inventive surface-treated sol-gel silica particle is particularly preferably subjected to such a surface treatment.

The present invention also provides a toner external additive for electrostatic charge image development comprising the above surface-treated sol-gel silica particle.

The inventive surface-treated sol-gel silica particle can impart good flowability and printing characteristics to a toner when used as a toner external additive.

Advantageous Effects of Invention

As described above, the present invention can provide: a surface-treated sol-gel silica particle that can improve toner flowability and charge abnormality due to change in environment that has occurred when the conventional fumed silica with a small particle diameter is used as the external additive; a toner external additive for electrostatic charge image development comprising the same; and a toner for electrostatic charge image development.

DESCRIPTION OF EMBODIMENTS

As noted above, there have been demands for an external additive for a toner that can impart good flowability when added into the toner and that has little change in charge amount when the environment changes.

The present inventors have made earnest study to achieve the above object, and consequently found that the surface-treated sol-gel silica particle that can impart good flowability when added into the toner and that has little change in charge amount when the environment changes can be obtained by surface-treating a spherical silica particle obtained by a sol-gel method with a specific organosilicon compound. This finding has led to complete the present invention.

Specifically, the present invention is a method for manufacturing a surface-treated sol-gel silica particle, the method comprising steps of:

(A1) hydrolyzing and condensing a tetrafunctional silane compound, a partially hydrolytic-condensed product thereof, or a mixture thereof to obtain a hydrophilic sol-gel silica particle having a silanol group on a surface and substantially composed of a $SiO_2$ unit;

(A2) adding a compound having a $(C_2H_5)_3Si$— group or a $R^1R^2_2Si$— group, wherein $R^1$ represents an alkyl group or alkenyl group having 2 to 8 carbon atoms or an aryl group having 6 to 8 carbon atoms, $R^2$ is identical to or different from each other and represents a substituted or unsubstituted alkyl group having 1 to 4 carbon atoms, to the hydrophilic sol-gel silica particle and introducing a $(C_2H_5)_3SiO_{1/2}$ unit or a $R^1R^2_2SiO_{1/2}$ unit, wherein $R^1$ and $R^2$ are same as above, on a surface of the hydrophilic sol-gel silica particle to obtain a preliminarily treated silica particle; and (A3) adding a compound having a $R^3_3Si$— group, wherein $R^3$ represents a substituted or unsubstituted monovalent hydrocarbon group having 1 to 6 carbon atoms, to the preliminarily treated silica particle and further introducing a $R^3_3SiO_{1/2}$ unit, wherein $R^3$ is same as above, on a surface of the preliminarily treated silica particle to obtain a surface-treated sol-gel silica particle, wherein the unit introduced on the surface of the hydrophilic sol-gel silica particle in the step (A2) and the unit introduced on the surface of the preliminarily treated silica particle in the step (A3) are different from each other.

Hereinafter, the present invention will be described in detail, but the present invention is not limited thereto.

(Method for Manufacturing Surface-Treated Sol-Gel Silica Particle)

Step (A1): Step of Synthesizing Hydrophilic Sol-Gel Silica Particle

The step (A1) is a step of hydrolyzing and condensing a tetrafunctional silane compound, a partially hydrolytic-condensed product thereof, or a mixture thereof to obtain a hydrophilic sol-gel silica particle having a silanol group on a surface and substantially composed of a $SiO_2$ unit.

In the step (A1), the hydrophilic sol-gel silica particle being "substantially composed of a $SiO_2$ unit" means that the particle is basically constituted with a $SiO_2$ unit, but constituted with not only the $SiO_2$ unit and the particle may have many silanol groups at least on its surface as commonly known. The description also means in some cases that a part of hydrolysable groups (hydrocarbyloxy groups) derived from the tetrafunctional silane compound and/or the partially hydrolytic-condensed product thereof, which are the raw material, may not be converted into the silanol groups and a small amount thereof may remain on the particle surface or an inside of the particle as it is.

In the present invention, the sol-gel-method silica particle with a small particle diameter obtained in the step (A1) by hydrolyzing the tetrafunctional silane compound, such as a tetraalkoxysilane, is used as a silica source (silica particle before the hydrophobizing treatment), and this silica source is subjected to the specific surface treatment to obtain the surface-treated sol-gel silica particle that has particle diameters after the hydrophobizing treatment retaining primary particle diameters of the silica source, that does not aggregate, that has a small particle diameter, and that is good as an external additive for a toner when obtained as a powder.

The step (A1) is preferably a step of hydrolyzing and condensing a tetrafunctional silane compound represented by the general formula (i):

$$Si(OR^4)_4 \tag{i}$$

wherein each of $R^4$ is identical to or different from each other and represents a monovalent hydrocarbon group having 1 to 6 carbon atoms, a partially hydrolytic-condensed product thereof, or a mixture thereof in the presence of a basic substance in a mixed liquid of a hydrophilic organic solvent and water to obtain a mixed-solvent-dispersion of a hydrophilic sol-gel silica particle.

In the general formula (i), $R^4$ represents a monovalent hydrocarbon group having 1 to 6 carbon atoms, preferably a monovalent hydrocarbon group having 1 to 4, particularly preferably 1 to 2, carbon atoms. Examples of the monovalent hydrocarbon group represented by $R^4$ include: alkyl groups, such as a methyl group, an ethyl group, a propyl group, and a butyl group; and aryl groups, such as a phenyl group, preferably a methyl group, an ethyl group, a propyl group, or a butyl group, and particularly preferably a methyl group or an ethyl group.

Examples of the tetrafunctional silane compound represented by the general formula (i) include: tetraalkoxysilanes, such as tetramethoxysilane, tetraethoxysilane, tetrapropoxysilane, and tetrabutoxysilane; and tetraphenoxysilane, preferably tetramethoxysilane, tetraethoxysilane, tetrapropoxysilane, and tetrabutoxysilane, and particularly preferably tetramethoxysilane and tetraethoxysilane. Examples of the partially hydrolytic-condensed product of the tetrafunctional silane compound represented by the general formula (i) include alkyl silicates, such as methyl silicate and ethyl silicate.

The hydrophilic organic solvent is not particularly limited as long as it dissolves the tetrafunctional silane compound represented by the general formula (i), the partially hydrolytic-condensed product thereof, and water. Examples thereof include: alcohols; cellosolves, such as methyl cellosolve, ethyl cellosolve, butyl cellosolve, and cellosolve acetate; ketones, such as acetone and methyl ethyl ketone; and ethers, such as dioxane and tetrahydrofuran. Preferable examples thereof include alcohols and cellosolves, and particularly preferable examples thereof include alcohols. Examples of the alcohols include an alcohol represented by the general formula (vi):

$$R^5OH \tag{vi}$$

wherein $R^5$ represents a monovalent hydrocarbon group having 1 to 6 carbon atoms.

In the general formula (vi), $R^5$ represents a monovalent hydrocarbon group having 1 to 6 carbon atoms, and preferably a monovalent hydrocarbon group having 1 to 4, particularly preferably 1 to 2, carbon atoms. Examples of the monovalent hydrocarbon group represented by $R^5$ include alkyl groups, such as a methyl group, an ethyl group, an n-propyl group, an isopropyl group, an n-butyl group, and a t-butyl group, preferably a methyl group, an ethyl group, a propyl group, an isopropyl group, and more preferably a methyl group and an ethyl group. Examples of the alcohols represented by the general formula (vi) include methanol, ethanol, propanol, isopropanol, and butanol, and preferably methanol and ethanol. Increasing the number of carbon atoms of the alcohol increases the particle diameter of the hydrophilic sol-gel silica particle to be generated. Therefore, methanol is preferable in order to obtain a silica particle with a small particle diameter.

Examples of the basic substance include ammonia, dimethylamine, and diethylamine, preferably ammonia and diethylamine, and particularly preferably ammonia. A needed amount of these basic substances are dissolved in water, and then the obtained (basic) aqueous solution is mixed with the above hydrophilic organic solvent.

The amount of the basic substance used is preferably 0.01 to 2 mol, more preferably 0.02 to 0.5 mol, and particularly preferably 0.04 to 0.12 mol, relative to 1 mol of the total of hydrocarbyloxy groups of the tetrafunctional silane compound represented by the general formula (i) and/or the partially hydrolytic-condensed product thereof. In this case, a smaller amount of the basic substance yields the silica particle with a smaller particle diameter.

The amount of water used in the hydrolysis and condensation is preferably 0.1 to 2 mol, and more preferably 0.1 to 1 mol, relative to 1 mol of the total of the hydrocarbyloxy groups of the tetrafunctional silane compound represented by the general formula (i) and/or the partially hydrolytic-condensed product thereof. The ratio of the hydrophilic organic solvent to water (the amount of the hydrophilic organic solvent/the amount of water) is preferably 0.2 to 10, and more preferably 0.3 to 5 at a mass ratio. A larger amount of the hydrophilic organic solvent yields the silica particle with a smaller particle diameter.

The hydrolysis and condensation of the tetrafunctional silane compound, etc. can be performed by a well-known method, specifically, adding the tetrafunctional silane compound and the basic substance into a mixture of the hydrophilic organic solvent and water.

The temperature during the hydrolysis and condensation is preferably 20 to 50° C. A higher temperature yields the silica particle with a smaller particle diameter.

The concentration of the hydrophilic sol-gel silica particle obtained in this step (A1) in the mixed-solvent-dispersion is typically 3 to 15 mass %, and preferably 5 to 10 mass %.

Step (A2): Step of Obtaining Preliminarily Treated Silica Particle

The step (A2) is a step of adding a compound having a $(C_2H_5)_3Si$— group or a $R^1R^2_2Si$— group, wherein $R^1$ represents an alkyl group or alkenyl group having 2 to 8 carbon atoms or an aryl group having 6 to 8 carbon atoms, and $R^2$ is identical to or different from each other and represents a substituted or unsubstituted alkyl group having 1 to 4 carbon atoms, into the hydrophilic sol-gel silica particle obtained in the step (A1), and introducing the $(C_2H_5)_3SiO_{1/2}$ unit or the $R^1R^2_2SiO_{1/2}$ unit, wherein $R^1$ and $R^2$ are same as above, on the surface of the hydrophilic sol-gel silica particle to obtain the preliminarily treated silica particle. This step allows the surface treatment in the following step (A3) to proceed more uniformly at high degree.

The step (A2) is preferably a step of adding a silazane compound represented by the general formula (ii):

$$R^1R^2_2SiNHSiR^1R^2_2 \quad \text{(ii)}$$

wherein $R^1$ and $R^2$ are same as above, hexaethyldisilazane, a monofunctional silane compound represented by the general formula (iii-1):

$$R^1R^2_2SiX \quad \text{(iii-1)}$$

wherein $R^1$ and $R^2$ are same as above and X represents an OH group or a hydrolysable group, a monofunctional silane compound represented by the general formula (iii-2):

$$(C_2H_5)_3SiX \quad \text{(iii-2)}$$

wherein X is same as above, or a mixture thereof into the obtained mixed-solvent-dispersion of the hydrophilic sol-gel silica particle, treating the surface of the hydrophilic sol-gel silica particle with the silazane compound, the monofunctional silane compound, or a mixture thereof, and introducing the $(C_2H_5)_3SiO_{1/2}$ unit or the $R^1R^2_2SiO_{1/2}$ unit, wherein $R^1$ and $R^2$ are same as above, on the surface of the hydrophilic sol-gel silica particle to obtain a mixed-solvent-dispersion of the preliminarily treated silica particle.

Examples of the alkyl group of $R^1$ having 2 to 8 carbon atoms include an ethyl group, an n-propyl group, an isopropyl group, an n-butyl group, a t-butyl group, an n-hexyl group, a cyclohexyl group, an n-octyl group, and a cyclooctyl group. Examples of the alkenyl group having 2 to 8 carbon atoms include a vinyl group, an allyl group, an n-butenyl group, an n-hexenyl group, and an n-octenyl group. Examples of the aryl group having 6 to 8 carbon atoms include a phenyl group, a 2-methylphenyl group, a 3-methylphenyl group, a 4-methylphenyl group, a 2,3-dimethylphenyl group, a 2,4-dimethylphenyl group, and a 2,6-dimethylphenyl group. $R^1$ preferably represents an alkyl group having 6 to 8 carbon atoms, phenyl group, or a vinyl group, and particularly preferably an n-octyl group, a phenyl group, or a vinyl group.

Examples of the alkyl group represented by $R^2$ having 1 to 4 carbon atoms include a methyl group, an ethyl group, an n-propyl group, an isopropyl group, an n-butyl group, and a t-butyl group, preferably a methyl group, an ethyl group, a propyl group, and an isopropyl group, and particularly preferably a methyl group and an ethyl group. A part or all of hydrogen atoms in these alkyl groups may be substituted with a halogen atom such as a fluorine atom, a chlorine atom, and a bromine atom, preferably a fluorine atom. $R^2$ represents a group differing from the $R^1$.

Examples of the hydrolysable group represented by X include a chlorine atom, an alkoxy group, an amino group, and an acyloxy group, preferably an alkoxy group or an amino group, and particularly preferably an alkoxy group.

Examples of the silazane compound represented by the general formula (ii) include 1,3-diethyltetramethyldisilazane, 1,3-di-n-propyltetramethyldisilazane, 1,3-di-n-butyltetramethyldisilazane, 1,3-di-n-hexyltetramethyldisilazane, 1,3-di-n-octyltetramethyldisilazane, 1,3-diphenyltetramethyldisilazane, 1,3-divinyltetramethyldisilazane, and 1,3-diallyltetramethyldisilazane.

Examples of the monofunctional silane compound represented by the general formula (iii-1) include: monoalkoxysilanes, such as ethyldimethylmethoxysilane, n-propyldimethylmethoxysilane, isopropyldimethylmethoxysilane, n-butyldimethylmethoxysilane, n-hexyldimethylmethoxysilane, n-octyldimethylmethoxysilane, phenyldimethylmethoxysilane, and vinyldimethylmethoxysilane; and silanol derivatives and monochloro derivatives thereof.

Examples of the monofunctional silane compound represented by the general formula (iii-2) include: monoalkoxysilanes, such as triethylmethoxysilane; and silanol derivatives and monochloro derivatives thereof.

The total amount of the added silazane compound represented by the general formula (ii), hexaethyldisilazane, and the monofunctional silane compound represented by the general formula (iii-1) or (iii-2) is preferably 0.001 to 1 mol, more preferably 0.02 to 0.5 mol, and particularly preferably 0.05 to 0.3 mol, relative to 1 mol of the $SiO_2$ unit in the hydrophilic sol-gel silica particle. Such a range can improve the efficiency of the surface treatment in the step (A3).

The reaction temperature of the surface treatment in the step (A2) is not particularly limited, but preferably 20 to 80° C., and more preferably 40 to 60° C.

Step (A3): Step of Obtaining Surface-Treated Sol-Gel Silica Particle

The step (A3) is a step of adding a compound having a $R^3{}_3Si$— group, wherein $R^3$ represents a substituted or unsubstituted monovalent hydrocarbon group having 1 to 6 carbon atoms, into the preliminarily treated silica particle obtained in the step (A2) and introducing a $R^3{}_3SiO_{1/2}$ unit, wherein $R^3$ is same as above, on the surface of the preliminarily treated silica particle to obtain the surface-treated sol-gel silica particle. In this step, the silanol group remained on the surface of the preliminarily treated silica particle is triorganosilylated to introduce the $R^3{}_3SiO_{1/2}$ unit, and the highly surface-treated sol-gel silica particle can be obtained.

The step (A3) is preferably a step of adding a silazane compound represented by the general formula (iv):

$$R^3{}_3SiNHSiR^3{}_3 \quad \text{(iv)}$$

wherein $R^3$ is same as above, a monofunctional silane compound represented by the general formula (v):

$$R^3{}_3SiX \quad \text{(v)}$$

wherein $R^3$ and X are same as above, or a mixture thereof into the obtained mixed-solvent-dispersion of the preliminarily treated silica particle, treating the surface of the preliminarily treated silica particle with the silazane compound, the monofunctional silane compound, or a mixture thereof, and introducing a $R^3{}_3SiO_{1/2}$ unit, wherein $R^3$ is same as above, on the surface of the preliminarily treated silica particle to obtain the surface-treated sol-gel silica particle.

$R^3$ represents a monovalent hydrocarbon group having 1 to 6 carbon atoms, preferably a monovalent hydrocarbon group having 1 to 4, particularly preferably 1 to 2 carbon atoms. Examples of the monovalent hydrocarbon group represented by $R^3$ include: alkyl groups, such as a methyl group, an ethyl group, an n-propyl group, an isopropyl group, an n-butyl group, and a t-butyl group; alkenyl groups, such as a vinyl group and an allyl group; and a phenyl group. The monovalent hydrocarbon group is preferably a methyl group or an ethyl group, and more preferably a methyl group. A part or all of hydrogen atoms in these groups may be substituted with a halogen atom such as a fluorine atom, a chlorine atom, and a bromine atom, preferably a fluorine atom.

Examples of X include groups same as described in the step (A2).

Examples of the silazane compound represented by the general formula (iv) include hexamethyldisilazane and hexaethyldisilazane, and preferably hexamethyldisilazane.

Examples of the monofunctional silane compound represented by the general formula (v) include: monosilanol compounds, such as trimethylsilanol and triethylsilanol; monochlorosilanes, such as trimethylchlorosilane and triethylchlorosilane; monoalkoxysilanes, such as trimethylmethoxysilane and trimethylethoxysilane; monoaminosilanes, such as trimethylsilyldimethylamine and trimethylsilyldiethylamine; and monoacyloxysilanes, such as trimethylacetoxysilane. Preferable examples thereof include trimethylsilanol, trimethylmethoxysilane, or trimethylsilyldiethylamine, and particularly preferable example thereof include trimethylsilanol or trimethylmethoxysilane.

The total amount of the added silazane compound represented by the general formula (iv) and the monofunctional silane compound represented by the general formula (v) is preferably 5 to 50 mol, and more preferably 10 to 30 mol, relative to 1 mol of the $SiO_2$ unit in the preliminarily treated silica particle. Such a range hardly causes aggregation between the particles and yields the surface-treated sol-gel silica particle having excellent dispersibility in a toner. Note that, the number of the $SiO_2$ units in the preliminarily treated silica particle equals the number of the $SiO_2$ units in the hydrophilic sol-gel silica particle that is the raw material therefor.

The reaction temperature of the surface treatment in the step (A3) is not particularly limited, but preferably 20 to 80° C., and more preferably 50 to 70° C.

The unit introduced on the surface of the hydrophilic sol-gel silica particle in the step (A2) and the unit introduced on the surface of the preliminarily treated silica particle in the step (A3) are different from each other. That is, when the $(C_2H_5)_3SiO_{1/2}$ unit is introduced on the surface of the hydrophilic sol-gel silica particle in the step (A2), the unit other than the $(C_2H_5)_3SiO_{1/2}$ unit is introduced on the surface of the preliminary treated silica in the step (A3).

The surface-treated sol-gel silica particle is obtained as a powder by common methods such as drying at a normal pressure and drying at a reduced pressure.

(Surface-Treated Sol-Gel Silica Particle)

The surface-treated sol-gel silica particle obtained by the inventive method for manufacturing a surface-treated sol-gel silica particle is a surface-treated sol-gel silica particle, comprising:

a $R^1R^2{}_2SiO_{1/2}$ unit, wherein $R^1$ represents an alkyl group or aryl group having 6 to 8 carbon atoms or a vinyl group, and $R^2$ is identical to or different from each other and represents an alkyl group having 1 to 4 carbon atoms, on a surface; and a $R^3{}_3SiO_{1/2}$ unit, wherein $R^3$ is identical to or different from each other and represents a substituted or unsubstituted monovalent hydrocarbon group having 1 to 6 carbon atoms, on a surface, wherein (1) a median diameter by a dynamic light scattering method is 5 nm to 99 nm, (2) an average circularity is 0.8 to 1.0, (3) a refractive index is 1.38 to 1.42, (4) a true density is 1.7 g/cm$^3$ or more and less than 1.9 g/cm$^3$, (5) a ratio represented by a water-vapor adsorption specific surface area/a nitrogen adsorption specific surface area is 0.4 to 1.9, and (6) a hydrophobicity degree with methanol is 67% or more and 75% or less.

Specific examples of $R^1$ to $R^3$ include groups same as the groups described above.

The combination of the above physical properties (1) to (6) imparts good flowability and printing characteristics to a toner when used as a toner external additive.

(1) Median Diameter by Dynamic Light Scattering Method

The median diameter by a dynamic light scattering method of the inventive surface-treated sol-gel silica particle is preferably 10 nm to 70 nm. A median diameter of less than 5 nm is unpreferable because many silica particles are embedded in the toner particles and the required addition amount increases when used as the toner external additive. A median diameter of more than 99 nm is unpreferable in terms of a decrease in flowability, a decrease in charge amount due to a decrease in the surface area, a decrease in adhesion force to the toner particle.

The median diameter can be determined from a particle size distribution of the surface-treated sol-gel silica particle measured by a dynamic light scattering method. The dynamic light scattering method is a method for determining a particle size distribution obtained from a scattering intensity by using a dynamic light scattering particle size distribution measuring apparatus (for example, NanotracWave II-Ex150, manufactured by MicrotracBEL). The method utilizes that the scattering intensity of scattered light obtained by irradiating a dispersion of silica particles with laser light varies depending on particle diameters of the silica-based fine particles.

(2) Average Circularity

The average circularity of the inventive surface-treated sol-gel silica particle is defined as (a circumference length of a circle having the same area as a particle area/a circumference length of the particle) when the particle is projected to two-dimension, and the average is preferably 0.92 to 1. An average circularity of less than 0.8 is unpreferable because the proportion of particles having an irregular shape increases to be likely to cause contamination of the toner.

(3) Refractive Index

The refractive index indicates a space inside the surface-treated sol-gel silica particle. A refractive index of less than 1.38, which means many spaces are present and the cross-linked structure of the sol-gel silica particle is fragile, is unpreferable. A refractive index of more than 1.42, which means few spaces and a large specific gravity, is unpreferable because the charge amount may decrease and adhesion force to the toner particles may decrease.

In the present invention, the refractive index of the surface-treated sol-gel silica particle is determined by: adding and dispersing the surface-treated sol-gel silica particles in a mixed solvent of toluene (refractive index: 1.4962) and methyl isobutyl ketone (refractive index: 1.3958); regulating the refractive index with the blending ratio of the solvents; and determining the refractive index of the mixed solvent at the point where the dispersion becomes clear at 25° C. (the point where the refractive index of the mixed solvent is equal to the refractive index of the surface-treated silica fine particle) as the refractive index of the surface-treated sol-gel silica particle.

(4) True Density

The true density is preferably 1.75 g/cm$^3$ to 1.85 g/cm$^3$. A true density of less than 1.7 g/cm$^3$ is unpreferable because strength of the surface-treated sol-gel silica particle may be deteriorated. A true density of 1.9 g/cm$^3$ or more, which indicates a larger weight per silica particle, is unpreferable in terms of increased impact applied to the toner particle when used as the toner external additive.

(5) Ratio of Water-Vapor Adsorption Specific Surface Area/Nitrogen Adsorption Specific Surface Area The ratio of the water-vapor adsorption specific surface area/the nitrogen adsorption specific surface area is an indicator of hygroscopicity, and the adsorption specific surface area of each gas can be determined by a BET method. Since a water molecule (approximately 2 Å) is smaller than a nitrogen molecule (approximately 3 Å), a small ratio of the water-vapor adsorption specific surface area/the nitrogen adsorption specific surface area consequently indicates the presence of spaces such that water molecules hardly penetrates but nitrogen penetrates.

The ratio of the water-vapor adsorption specific surface area/the nitrogen adsorption specific surface area is preferably 0.5 to 1.5. A ratio of this specific surface area of more than 1.9, which is excessively high hygroscopicity, is unpreferable because the charge amount of the toner is significantly affected by the humidity.

(6) Hydrophobicity Degree with Methanol

The hydrophobicity degree with methanol indicates hydrophobicity of the surface-treated sol-gel silica particle. A hydrophobicity degree with methanol of less than 67% is unpreferable because the charge amount of the toner is significantly affected by humidity due to the remained silanol groups on the silica surface when the particle is added to the toner as the toner external additive for electrostatic charge image development. In addition, such silica fine particles easily aggregate with each other, which causes poor dispersibility in the toner, and poor flowability of the toner and printed image quality. If the hydrophobicity degree with methanol is more than 75%, the charge amount of the toner may be excessively high when the particle is added into the toner. The hydrophobicity degree with methanol in the present invention refers to a value measured under the following condition.

<Method for Measuring Hydrophobicity Degree with Methanol>

Into 60 ml of an aqueous solution of methanol at a volume concentration of 50% (temperature: 25° C.), 0.2 g of the surface-treated sol-gel silica particle is added, and the mixture is stirred with a stirrer. Then, with dropping methanol into the liquid in which the silica particles float on the surface, the aqueous solution of methanol is irradiated with light at a wavelength of 780 nm to measure the transmittance. Specified as the hydrophobicity degree with methanol is a volume concentration (%) of methanol in an aqueous solution of methanol at a time where the silica particles are suspended or precipitated and the transmittance becomes 80%.

(Toner External Additive for Electrostatic Charge Image Development)

The present invention also provides a toner external additive for electrostatic charge image development comprising the above surface-treated sol-gel silica particle. Using the inventive surface-treated sol-gel silica particle as the toner external additive imparts good flowability and printing characteristics to the tonner.

EXAMPLE

Hereinafter, the present invention will be specifically described by using Examples and Comparative Examples, but the present invention is not limited thereto.

(Manufacture of Surface-Treated Sol-Gel Silica Particle)

Example 1-1

Step (A1): Into a 3-L reaction container made of glass equipped with a stirrer, a dropping funnel, and a thermometer, 793.0 g of methanol, 32.1 g of water, and 40.6 g of 28% aqueous ammonia were added and mixed. This solution was adjusted to 45° C., 160.9 g of 5.5% aqueous ammonia and 646.5 g of tetramethoxysilane were simultaneously started to be dropped with stirring the solution. The former was added dropwise over 4 hours, and the latter was added dropwise over 6 hours. The mixture was further continuously stirred for 0.5 hours for hydrolysis after the dropwise addition of tetramethoxysilane was finished to obtain a dispersion of hydrophilic sol-gel silica particles.

Step (A2): Into the dispersion obtained in the step (A1), 2.0 g of 1,3-divinyl-1,1,3,3-tetramethyldisilazane (an amount equivalent to 0.26 mol relative to 1 mol of $SiO_2$) was fed at 25° C., and then the mixture was stirred at 50° C. for 1 hour to obtain a dispersion of preliminarily treated silica particles with dimethylvinylsilylated surfaces.

Step (A3): Into the dispersion obtained in the step (A2), 205.3 g of hexamethyldisilazane (an amount equivalent to 30 mol relative to 1 mol of $SiO_2$) was added dropwise at 25° C. over 0.5 hours, and then the mixture was subjected to a reaction at 60° C. for 8 hours to obtain a dispersion of surface-treated sol-gel silica particles with further trimethylsilylated surfaces. Subsequently, the dispersion medium in this dispersion was evaporated at 130° C. under a reduced pressure (6650 Pa) to obtain 271 g of a white powder of a surface-treated sol-gel silica particle (I).

Example 1-2

In the same manner as in Example 1-1 except that the reaction temperature in the step (A1) was 35° C., 272 g of a white powder of a surface-treated sol-gel silica particle (II) was obtained.

Example 1-3

In the same manner as in Example 1-1 except that the reaction temperature in the step (A1) was 27° C., 269 g of a white powder of a surface-treated sol-gel silica particle (III) was obtained.

Example 1-4

In the same manner as in Example 1-1 except that the reaction temperature in the step (A1) was 25° C., 273 g of a white powder of a surface-treated sol-gel silica particle (IV) was obtained.

Example 1-5

In the same manner as in Example 1-1 except that 3.1 g of 1,3-diphenyl-1,1,3,3-tetramethyldisilazane (an amount equivalent to 0.26 mol relative to 1 mol of $SiO_2$) was used instead of 1,3-divinyl-1,1,3,3-tetramethyldisilazane in the step (A2), 274 g of a white powder of a surface-treated sol-gel silica particle (V) was obtained.

Example 1-6

In the same manner as in Example 1-1 except that 3.9 g of 1,3-di-n-octyl-1,1,3,3-tetramethyldisilazane (an amount equivalent to 0.26 mol relative to 1 mol of $SiO_2$) was used instead of 1,3-divinyl-1,1,3,3-tetramethyldisilazane in the step (A2), 275 g of a white powder of a surface-treated sol-gel silica particle (VI) was obtained.

Comparative Example 1-1

In Example 1-1, the step (A1) was performed, the step (A2) was not performed, and as the step (A3), 205.3 g of hexamethyldisilazane (an amount equivalent to 30 mol relative to 1 mol of $SiO_2$) was added dropwise into the dispersion obtained in the step (A1) at 25° C. over 0.5 hours, and then the mixture was subjected to a reaction at 60° C. for 8 hours to obtain a dispersion of surface-treated sol-gel silica particles with trimethylsilylated surfaces. Subsequently, the dispersion medium in this dispersion was evaporated at 130° C. under a reduced pressure (6650 Pa) to obtain 268 g of a white powder of a surface-treated sol-gel silica particle (VII).

Comparative Example 1-2

In Example 1-3, the step (A1) was performed, the step (A2) was not performed, and as the step (A3), 205.3 g of hexamethyldisilazane (an amount equivalent to 30 mol relative to 1 mol of $SiO_2$) was added dropwise into the dispersion obtained in the step (A1) at 25° C. over 0.5 hours, and then the mixture was subjected to a reaction at 60° C. for 8 hours to obtain a dispersion of surface-treated sol-gel silica particles with trimethylsilylated surfaces. Subsequently, the dispersion medium in this dispersion was evaporated at 130° C. under a reduced pressure (6650 Pa) to obtain 268 g of a white powder of a surface-treated sol-gel silica particle (VIII).

The surface-treated sol-gel silica particles (I) to (VIII) obtained in the above steps were measured in accordance with the following measurement methods (1) to (6). Table 1 shows the results.

Measurement Methods (1) Median Diameter by Dynamic Light Scattering Method

Into a vial, 0.1 g of the surface-treated sol-gel silica particle and 19.9 g of methanol were added, the vial was placed in an ultrasonic-wave washing apparatus and irradiated with ultrasonic wave with an output of 30 W/L for 10 minutes to disperse the silica particles in methanol. The median diameter of the particles of this dispersion was measured by using a dynamic light scattering particle size distribution measuring apparatus (NanotracWave II-Ex150, manufactured by MicrotracBEL).

(2) Circularity

The surface-treated sol-gel silica particle was photographed by using an electron microscope (S-4700, manufactured by Hitachi, Ltd., magnification: 100 thousands), and the circularity (the circumference length of a circle having the same area as the particle area/the circumference length of the particle) of the particle when the particle is projected to two dimension was evaluated with an image-analysis-type particle size distribution measuring software (Mac-View Ver. 5, manufactured by Mountech Co., Ltd.). Used as the circularity was an average value of measurements on 100 primary particles.

(3) Refractive Index

The surface-treated sol-gel silica particles were added and dispersed in a mixed solvent of toluene (refractive index: 1.4962) and methyl isobutyl ketone (refractive index: 1.3958) to regulate the refractive index with the blending ratio of the solvents, and the refractive index of the mixed solution at the point where the dispersion became clear (the point where the refractive index of the mixed solvent was equal to the refractive index of the surface-treated silica fine particle) was specified as the refractive index of the surface-treated sol-gel silica particle. The refractive index of the mixed solvent is a value at 25° C. measured by using a digital refractometer (RX-9000a, manufactured by ATAGO CO., LTD.).

(4) True Density

The true density of the surface-treated sol-gel silica particle was measured by using an automatic true density measuring apparatus (Auto True Denser MAT-7000, manufactured by Seishin Enterprise Co., Ltd.) using a liquid-phase displacement method.

(5) Ratio of Water-Vapor Adsorption Specific Surface Area/Nitrogen Adsorption Specific Surface Area The specific surface areas of the surface-treated sol-gel silica particle with each of a water-vapor medium and a nitrogen medium were measured by using a high-precision gas adsorption analyzer (BELSORP MAX II, manufactured by MicrotracBEL) with a BET 1-point method, and the ratio of the water-vapor adsorption specific surface area/the nitrogen adsorption specific surface area was determined.

(6) Hydrophobicity Degree with Methanol

By using a powder wettability tester (WET101P, manufactured by RHESCA Co., LTD.), 0.2 g of the surface-treated sol-gel silica particle was added into 60 ml of an aqueous solution of methanol at a volume concentration of 50% (temperature: 25° C.), and the mixture was stirred with a stirrer. Then, with dropping methanol into the liquid in which the silica particles floated on the surface, the aqueous solution of methanol was irradiated with light at a wavelength of 780 nm to measure the transmittance. Specified as the hydrophobicity degree with methanol was a volume concentration (%) of methanol in the aqueous solution of methanol at a time where the surface-treated sol-gel silica particles were suspended or precipitated and the transmittance became 80%.

TABLE 1

| | surface-treated sol-gel silica particle | (1) Median diameter (nm) | (2) Average circularity | (3) Refractive index | (4) True density (g/cm$^3$) | (5) Ratio of water-vapor adsorption specific surface area/nitrogen adsorption specific surface area | (6) Hydro-phobicity degree with methanol (%) |
|---|---|---|---|---|---|---|---|
| Ex. 1-1 | (I) | 15 | 0.92 | 1.396 | 1.7250 | 0.59 | 74 |
| Ex. 1-2 | (II) | 33 | 0.91 | 1.396 | 1.7249 | 0.71 | 73 |
| Ex. 1-3 | (III) | 82 | 0.90 | 1.398 | 1.7250 | 0.85 | 70 |
| Ex. 1-4 | (IV) | 95 | 0.91 | 1.398 | 1.7249 | 0.88 | 69 |
| Ex. 1-5 | (V) | 18 | 0.91 | 1.397 | 1.7249 | 0.56 | 73 |
| Ex. 1-6 | (VI) | 17 | 0.89 | 1.397 | 1.7249 | 0.81 | 75 |
| Comp. Ex. 1-1 | (VII) | 14 | 0.90 | 1.396 | 1.7250 | 0.61 | 64 |
| Comp. Ex. 1-2 | (VIII) | 81 | 0.90 | 1.398 | 1.7250 | 0.82 | 59 |

As shown in Table 1, the surface-treated sol-gel silica particles of Examples 1-1 to 1-6 exhibited a high hydrophobicity degree with methanol, and had a highly hydrophobized surface. Meanwhile, Comparative Examples 1-1 and 1-2 resulted in insufficient hydrophobization of the surface.

(Manufacture of External Additive-Mixed Toner)

Examples 2-1 to 2-6 and Comparative Examples 2-1 and 2-2

Melt-kneading of 96 parts by weight of a polyester resin having Tg of 60° C. and a softening point of 110° C. and 4 parts by weight of CARMINE 6BC (manufactured by SUMIKA COLOR CO., LTD.) as a colorant was performed, and the mixture was crushed and classified to obtain a toner having a volumetric median diameter of 7 μm. Mixing of 10 g of this toner and 0.2 g of each of the surface-treated sol-gel silica particles obtained in Examples 1-1 to 1-6 and Comparative Examples 1-1 and 1-2 was performed with a sample mill to obtain an external additive-mixed toner. These toners were evaluated by the following method (7).

(7) Toner Aggregation Degree

Into a 20-ml polyethylene container, 10 g of the external additive-mixed toner was added and exposed for 100 hours to a condition at a constant-temperature of 60° C. and constant-humidity of 30% RH in a state where the lid of the container was open. Then, 5 g of the toner was vibrated by using a powder characteristics evaluating apparatus (Powder Tester PT-X, manufactured by HOSOKAWA MICRON CORPORATION) using sieves having an aperture of 150 μm, 75 μm, and 45 μm from the upper side with a vibration width of 1 mm and a vibration frequency of 1 Hz for 60 seconds. After the vibration, amounts of the mixture remained on the sieves were measured to calculate the aggregation degree with the following formula. Table 2 shows the results.

$$\text{Aggregation Degree }(\%)=(W_1+0.6\times W_2+0.2\times W_3)/5\times 100$$

$W_1$: A remained amount (g) on the sieve having an aperture of 150 μm.

$W_2$: A remained amount (g) on the sieve having an aperture of 75 μm.

$W_3$: A remained amount (g) on the sieve having an aperture of 45 μm.

| | surface-treated sol-gel silica particle | (7) Toner Aggregation degree |
|---|---|---|
| Ex. 2-1 | (I) | 21.1 |
| Ex. 2-2 | (II) | 22.0 |
| Ex. 2-3 | (III) | 28.7 |

-continued

| | surface-treated sol-gel silica particle | (7) Toner Aggregation degree |
|---|---|---|
| Ex. 2-4 | (IV) | 29.7 |
| Ex. 2-5 | (V) | 21.0 |
| Ex. 2-6 | (VI) | 27.5 |
| Comp. Ex. 2-1 | (VII) | 45.3 |
| Comp. Ex. 2-2 | (VIII) | 52.2 |

As shown in Table 2, the external additive-mixed toners of Examples 2-1 to 2-6 exhibited a low aggregation degree. The inventive surface-treated sol-gel silica particle is found to be suitably used as the toner external additive. Meanwhile, Comparative Examples 2-1 and 2-2, which performed the insufficient surface treatment of the silica particle, resulted in a high aggregation degree.

(Manufacture of Two-Component Developer)

Examples 3-1 to 3-6 and Comparative Examples 3-1 and 3-2

Mixing of 3 parts by mass of each of the external additive-mixed toners of Examples 2-1 to 2-6 and Comparative Examples 2-1 and 2-2 and 97 parts by mass of Standard Ferrite L (The Imaging Society of Japan) being a carrier was performed to prepare a two-component developer. The two-component developer obtained in the above steps was measured in accordance with the following methods (8) to (12). Table 3 show the results.

(8) Charge Amount of Toner

The two-component developer was exposed for one day to each condition of high-temperature and high-humidity (30° C., 90% RH), medium-temperature and medium-humidity (25° C., 55% RH), and low-temperature and low-humidity (10° C., 15% RH). Then, each of the samples was frictionally charged under the same conditions, and the charge amount in this time was measured by using a blow-off powder charge amount measuring apparatus (TB-200, manufactured by Toshiba Chemical Corp.).

(9) Adhesion of Toner to Photoreceptor

The two-component developer was added into a developing apparatus equipped with an organic photoreceptor, and a printing test with 30,000 sheets was performed under an environment at 25° C. and 50% RH. In this time, adhesion of the toner to the photoreceptor can be detected as a void in a full solid image. Here, the degree of the voids was evaluated as follows: 10 or more voids per $cm^2$ was evaluated as "many", 1 to 9 voids was evaluated as "few", and 0 voids was evaluated as "none".

(10) Photoreceptor Wearing

In the printing test in the above (9), photoreceptor wearing detected as disorder of the image was evaluated with the following criteria.

A: There is no disorder of the image.

B: There is no large disorder of the image.

C: There is disorder of the image.

(11) Evaluation of Image Defect (White Spot)

The two-component developer was exposed for one day to an environment at 30° C. and 90% RH, then 5,000 sheets was continuously printed with solid printing (image density: 100%) with 20 cm square, and thereafter, the two-component developer was left to stand again under the environment at 30° C. and 90% RH. This was repeated 60 times to print total 300,000 sheets. The 10th print in the first day was specified as a print 1, and the last print in the last day was specified as a print 2.

Presence or absence of an image defect (white spot) in the print 2 obtained above was evaluated with image observation in accordance with the following criteria.

A: There is no image defect (no white spot) with visual observation.

B: There are 1 to 4 white spots (image with particulate voids) with visual observation.

C: There are 5 to 9 white spots with visual observation.

D: There are 10 or more white spots with visual observation.

(12) Evaluation of Change in Density (ΔE)

A change in density of the print 2 relative to the print 1 was evaluated under the following criteria by measuring a color difference (ΔE) in a color space CIE1976 (L*a*b*) by using a reflective densitometer X-rite938 (manufactured by X-Rite, Incorporated) in accordance with JIS Z 8781-5.

A: ΔE was less than 1.

B: ΔE was 1 or more and less than 2.5.

C: ΔE was 2.5 or more and less than 3.0.

D: ΔE was 3.0 or more.

TABLE 3

| | surface-treated sol-gel silica particle | (8) Toner charge amount (μc/g) 30° C., 90% RH | 25° C., 55% RH | 10° C., 15% RH | (9) Adhesion of toner to photo-receptor | (10) Photo-receptor wearing | (11) Image defect | (12) Change in density (ΔE) |
|---|---|---|---|---|---|---|---|---|
| Ex. 3-1 | (I) | −35 | −41 | −45 | None | A | A | A |
| Ex. 3-2 | (I) | −30 | −35 | −40 | None | A | A | A |
| Ex. 3-3 | (III) | −27 | −32 | −38 | None | A | A | A |
| Ex. 3-4 | (IV) | −25 | −30 | −35 | None | A | A | A |
| Ex. 3-5 | (V) | −39 | −43 | −46 | None | A | A | A |
| Ex. 3-6 | (VI) | −40 | −44 | −48 | None | A | A | A |

TABLE 3-continued

| | surface-treated sol-gel silica particle | (8) Toner charge amount (μc/g) 30° C., 90% RH | 25° C., 55% RH | 10° C., 15% RH | (9) Adhesion of toner to photo-receptor | (10) Photo-receptor wearing | (11) Image defect | (12) Change in density (ΔE) |
|---|---|---|---|---|---|---|---|---|
| Comp. Ex. 3-1 | (VII) | −23 | −34 | −45 | Few | B | D | D |
| Comp. Ex. 3-2 | (VIII) | −19 | −28 | −42 | Few | B | C | C |

As shown in Table 3, the two-component developers in which the surface-treated sol-gel silica particles obtained in Examples 1-1 to 1-6 were used as the toner external additive had small variation of the toner charge amount due to the environment, and exhibited no defect in the printed image. Meanwhile, those using the surface-treated sol-gel silica particles obtained in Comparative Examples 1-1 and 1-2 had large variation of the toner charge amount due to the environment, and had poor printing characteristics.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A method for manufacturing a surface-treated sol-gel silica particle, the method comprising steps of:

(A1) hydrolyzing and condensing a tetrafunctional silane compound represented by the general formula (i):

$$Si(OR^4)_4 \quad \text{(i)}$$

wherein each of R4 is identical to or different from each other and represents a monovalent hydrocarbon group having 1 to 6 carbon atoms, a partially hydrolytic-condensed product thereof, or a mixture thereof in the presence of a basic substance in a mixed liquid of a hydrophilic organic solvent and water to obtain a mixed-solvent-dispersion of a hydrophilic sol-gel silica particle having a silanol group on a surface and substantially composed of a $SiO_2$ unit;

(A2) adding a silazane compound represented by the general formula (ii):

$$R^1R^2_2SiNHSiR^1R^2_2 \quad \text{(ii)}$$

wherein R1 represents an alkyl group or alkenyl group having 2 to 8 carbon atoms or an aryl group having 6 to 8 carbon atoms, R2 is identical to or different from each other and represents a substituted or unsubstituted alkyl group having 1 to 4 carbon atoms, hexaethyldisilazane, a monofunctional silane compound represented by the general formula (iii-1):

$$R^1R^2_2SiX \quad \text{(iii-1)}$$

wherein $R^1$ and $R^2$ are same as above and X represents an OH group or a hydrolysable group, a monofunctional silane compound represented by the general formula (iii-2):

$$(C_2H_5)_3SiX \quad \text{(iii-2)}$$

wherein X is same as above, or a mixture thereof into the obtained mixed-solvent-dispersion of the hydrophilic sol-gel silica particle at 0.001 to 1 mol relative to 1 mol of the $SiO_2$ unit in the hydrophilic sol-gel silica particle and introducing a $(C_2H_5)_3SiO_{1/2}$ unit or a $R^1R^2_2SiO_{1/2}$ unit, wherein $R^1$ and $R^2$ are same as above, on a surface of the hydrophilic sol-gel silica particle to obtain a mixed-solvent-dispersion of a preliminarily treated silica particle; and (A3) adding a silazane compound represented by the general formula (iv):

$$R^3_3SiNHSiR^3_3 \quad \text{(iv)}$$

wherein R3 represents a substituted or unsubstituted monovalent hydrocarbon group having 1 to 6 carbon atoms, a monofunctional silane compound represented by the general formula (v):

$$R^3_3SiX \quad \text{(v)}$$

wherein $R^3$ and X are same as above, or a mixture thereof into the obtained mixed-solvent-dispersion of the preliminarily treated silica particle at 5 to 50 mol relative to 1 mol of the $SiO_2$ unit in the preliminarily treated silica particle and introducing a $R^3_3SiO_{1/2}$ unit, wherein $R^3$ is same as above, on a surface of the preliminarily treated silica particle to obtain a surface-treated sol-gel silica particle, wherein the unit introduced on the surface of the hydrophilic sol-gel silica particle in the step (A2) and the unit introduced on the surface of the preliminarily treated silica particle in the step (A3) are different from each other.

2. The method for manufacturing a surface-treated sol-gel silica particle according to claim 1, wherein the $R^1$ represents an alkyl group having 6 to 8 carbon atoms, a phenyl group, or a vinyl group, the $R^2$ represents a methyl group, an ethyl group, a propyl group, or an isopropyl group, and the $R^3$ represents a methyl group or an ethyl group.

3. A surface-treated sol-gel silica particle, comprising:

a $R^1R^2_2SiO_{1/2}$ unit, wherein R1 represents an alkyl group or aryl group having 6 to 8 carbon atoms or a vinyl group, and R2 is identical to or different from each other and represents an alkyl group having 1 to 4 carbon atoms, on a surface; and a $R^3_3SiO_{1/2}$ unit, wherein R3 is identical to or different from each other and represents a substituted or unsubstituted monovalent hydrocarbon group having 1 to 6 carbon atoms, on a surface, wherein a median diameter by a dynamic light scattering method is 5 nm to 99 nm, an average circularity is 0.8 to 1.0, a refractive index is 1.38 to 1.42, a true density is 1.7 g/cm$^3$ or more and less than 1.9 g/cm$^3$, a ratio represented by a water-vapor adsorption specific surface area/a nitrogen adsorption specific surface area is 0.4 to 1.9, and a hydrophobicity degree with methanol is 67% or more and 75% or less.

4. The surface-treated sol-gel silica particle according to claim 3, wherein the R1 represents an alkyl group having 6 to 8 carbon atoms, a phenyl group, or a vinyl group, the R2 represents a methyl group, an ethyl group, a propyl group, or an isopropyl group, and the R3 represents a methyl group or an ethyl group.

5. A toner external additive for electrostatic charge image development, comprising the surface-treated sol-gel silica particle according to claim 3.

6. A toner external additive for electrostatic charge image development, comprising the surface-treated sol-gel silica particle according to claim 4.

* * * * *